United States Patent Office 3,145,379
Patented Aug. 18, 1964

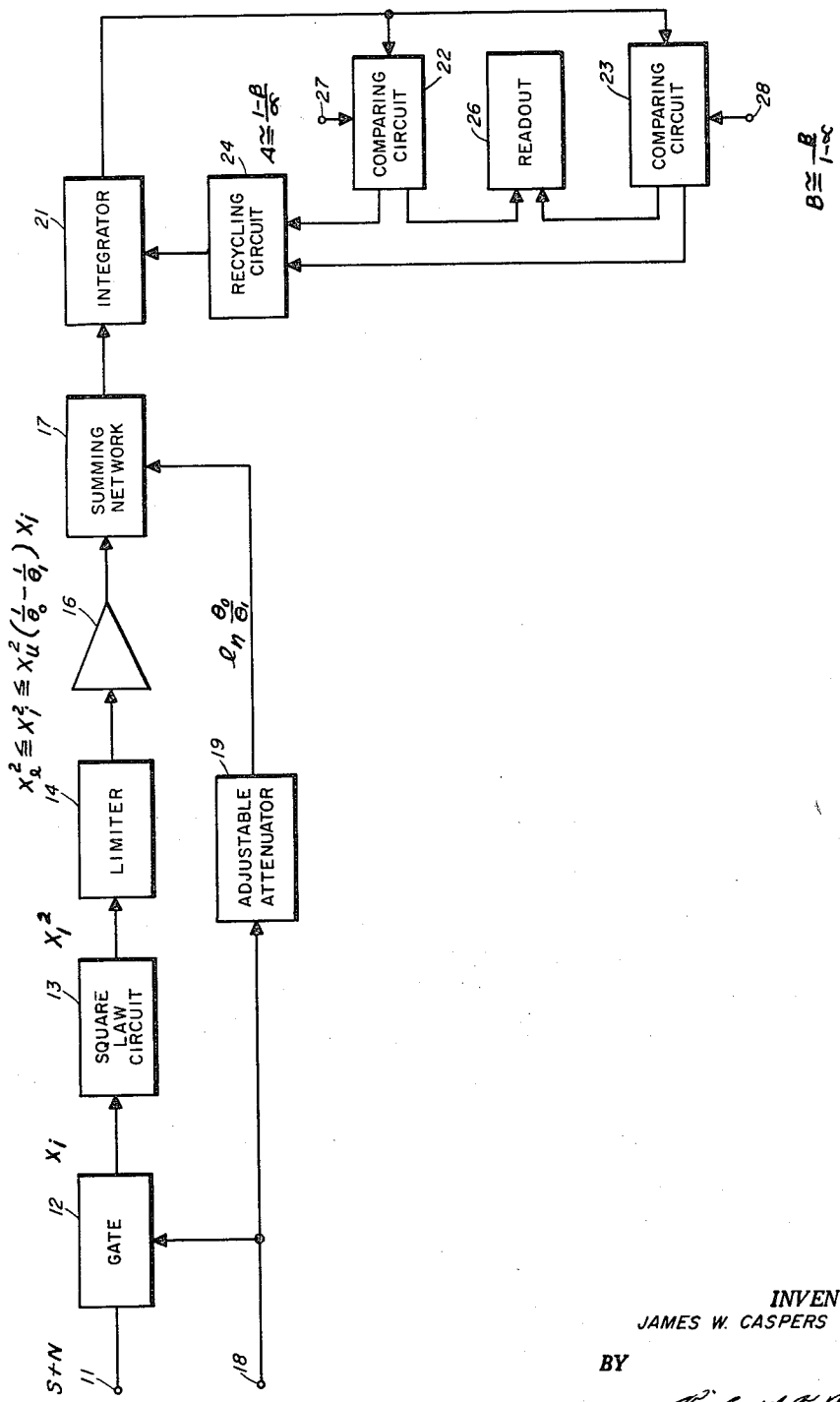

3,145,379
SEQUENTIAL SIGNAL DETECTOR
James W. Caspers, San Diego, Calif., assignor to the United States of America as represented by the Secretary of the Navy
Filed Sept. 27, 1960, Ser. No. 58,855
4 Claims. (Cl. 343—5)
(Granted under Title 35, U.S. Code (1952), sec. 266)

The invention described herein may be manufactured and used by or for the Government of the United States of America for governmental purposes without the payment of any royalties thereon or therefor.

This invention relates to a sequential signal detector and more particularly to a sequential signal detector based on the Wald sequential probability ratio test.

The prior art automatic radar detectors where the signals are embedded in noise are based on the classical Neyman-Pearson or fixed sample theory of decision making. This type of detector samples the output from the radar receiver and integrates or adds a given number of observation points. If the resulting sum reaches a predetermined level this is displayed, or recorded as, a signal being present, otherwise the lack of signal is indicated. The fundamental requirement is that a fixed number of observations, a fixed length of time, be integrated before a decision is reached.

The threshold signal concept is convenient for explanation and comparison purposes. This is defined as the smallest signal to be detected and is used for detector design. Since the number of observations are based on this threshold signal the Neyman-Pearson type detector will require the same number of observations or detection time for signals far above the threshold signal. This is the most serious disadvantage of specifying the number of observations before the detection process begins. Furthermore, this detector usually requires an excessive number of observations, for the threshold signal case as well.

The invention obviates these difficulties since the number of observations, length of time, is not specified before the detection process begins. After each observation a signal or noise decision is rendered only if sufficient data are accumulated, otherwise another observation is taken. Decisions are reached very rapidly for large signals with the probability of missing the signal becoming smaller as the signal strength increases. Quicker decisions are also obtained even in the threshold signal case as well as the case where no signal is present. Quicker decisions in the case of no signal is quite important since faster search processes result.

According to the invention, the output from the radar receiver is first passed through a gating circuit by which it is periodically sampled and then squared in a squaring circuit. It is then limited in both directions in a limiting circuit, amplified, and passed to a summation network. A control pulse is passed to the gating circuit and through an adjustable attenuator to another input of the summing circuit. The output of the summing circuit is then integrated and passed into two comparing circuits. Each comparing circuit has a different reference level applied thereto and when this predetermined level is reached in either one, an output pulse is passed to a recycling network which discharges the integrator and provides a pulse for the readout equipment. One comparing circuit, of course, signifies the presence of a signal, and the other, the absence of a signal.

It is thus an object of the present invention to provide a sequential detector in which the total number of samplings is not fixed, and is reduced on the average by not being fixed.

Another object of the present invention is to provide a sequential detector in which the readout information is obtained automatically and positively.

Still another object of the present invention is the provision of a sequential detector in which the absence of a signal is as definitely determined and indicated as the presence of a signal in a minimum of time for optimum search rates.

Other objects and many of the attendant advantages of the invention will become more readily apparent with reference to the following detailed description taken in conjunction with the drawing in which the sole figure is a block diagram of a preferred embodiment thereof.

Referring to the drawing, there is shown input terminal 11 connected through gate 12 to square law device 13. The output of square law device 13 is connected to limiter 14, the output of which is amplified in amplifier 16, and passed to one input of summing network 17. Input terminal 18 is connected to gate 12 and adjustable attenuator 19. The output of adjustable attenuator 19 is connected to another input of summing network 17. The output of summing network 17 is connected to the input of integrator 21, the output of which is connected to the inputs of comparing circuits 22 and 23. The outputs of comparing circuits 22 and 23 are connected to recycling circuit 24 and readout circuits 26. Comparing circuit 22 has a reference input terminal 27, and comparing circuit 23 has a reference input terminal 28.

*Operation*

In operation the output of a radar receiver is coupled to input terminal 11, which is coupled to the signal input of gate 12. At terminal 18 a gating pulse is applied, which can be supplied from the radar equipment in coincidence with the video signal of interest. This can be derived from a variable range pulse, for example, which could be placed under the target or area of interest, etc. Gate 12 then is gated in coincidence with the cycling of the radar equipment at the desired time. The output of gate 12 is then squared in square law device 13 and bounded within predetermined limits in limiter 14. The output of limiter 14 is then amplified in amplifier 16 and passed to one input of summing network 17. The gating pulse is also passed through adjustable attenuator 19 and applied to another input of summing network 17. At this point, it is emphasized that the two inputs of the summing network are of opposite polarities, i.e., if the output of amplifier 16 is taken to be positive video then the output of adjustable attenuator 19 is a negative pulse. The output of summing network 17 is then integrated in integrator 21 and applied to the inputs of comparing circuits 22 and 23. In the absence of a signal from amplifier 16 the output from attenuator 19 will overcome the noise present at the output of amplifier 16 and will result in the output of the integrator 21 eventually reaching the level of voltage applied at terminal 28 of comparing circuit 23. When the input to comparing circuit 23 and the voltage applied at terminal 28 are equal, comparing circuit 23 will yield an output pulse. This is accomplished through the use of well known and conventional circuitry, such as Schmidt comparting circuit, so further explanation is deemed unnecessary. The output then of comparing circuit 23 is fed into readout block 26 to record, in this instance, a lack of signal, and also to one input of recycling circuit 24. Recycling circuit 24 can be any of the well known switching devices such as a relay. The purpose of recycling circuit 24 is to discharge integrator 21 and to ready it for recycling to make a determination on the next group of pulses.

If a signal is present the output from amplifier 16 will overcome the output of adjustable attenuator 19 and integrator 21 will eventually reach the level set at input terminal 27 of comparing circuit 22. When this happens, comparing circuit 22 will produce a pulse which again is coupled to readout circuitry 26 and to recycling circuit 24 for discharging integrator 21 and rendering it in condition for another set of pulses. This, of course, will indicate the presence of a signal.

The mathematical analysis for determining, for example, the limits of limiter 14, the desired output of adjustable attenuator 19, the levels set at terminals 27 and 28 of comparing circuits 22 and 23, respectively, and the necessity for square law device 13 will now follow.

*Mathematical Analysis*

In the following analysis let:

$x$ = one voltage observation from a radar receiver.
$x_1$ = the first voltage observation from a radar receiver.
$f(x)$ = probable density function for any observation $x$ of the $Rx$ voltage.
$\sigma^2$ = the combined signal plus noise power input.
$P_{in}$ = probable density for the occurrence of a specified sequence of $n$ observations (when a signal is present).
$P_{on}$ = probable density for the occurrence of a specified sequence of $n$ observations (when only noise is present).

Let the noise and signal plus noise statistics be Rayleigh, $$(1) \quad f(x) = \frac{x}{\sigma^2} \exp\left(-\frac{x^2}{2\sigma^2}\right) \quad 0 \leq x < \infty$$

where $\sigma = \sigma_0$ in the noise case and $\sigma = \sigma_1$ in the signal case;

$$(2) \quad f_0(x) = \frac{x}{\sigma_0^2} \exp\left(-\frac{x^2}{2\sigma_0^2}\right)$$

and $$(3) \quad f_1(x) = \frac{x}{\sigma_1^2} \exp\left(-\frac{x^2}{2\sigma_1^2}\right)$$

respectively.

Given $n$ statistically independent observations the probability ratio $$(4) \quad \frac{P_{in}}{P_{on}} = \frac{f_1(x_1) f_1(x_2) \ldots f_1(x_n)}{f_0(x_1) f_0(x_2) \ldots f_0(x_n)}$$

where $x_i$ denotes the $i$th observation.

In the Rayleigh case this probability ratio becomes $$(5) \quad \frac{P_{in}}{P_{on}} = \frac{\frac{x_1}{\sigma_1^2}\exp\left(-\frac{x_1^2}{2\sigma_1^2}\right) \cdot \frac{x_2}{\sigma_1^2}\exp\left(-\frac{x_2^2}{2\sigma_1^2}\right) \ldots \frac{x_n}{\sigma_1^2}\exp\left(-\frac{x_n^2}{2\sigma_1^2}\right)}{\frac{x_1}{\sigma_0^2}\exp\left(-\frac{x_1^2}{2\sigma_0^2}\right) \cdot \frac{x_2}{\sigma_0^2}\exp\left(-\frac{x_2^2}{2\sigma_0^2}\right) \ldots \frac{x_n}{\sigma_0^2}\exp\left(-\frac{x_n^2}{2\sigma_0^2}\right)}$$

$$(6) \quad = \frac{\frac{\sigma_0^2}{\sigma_1^2}\exp\left(-\frac{x_1^2}{2\sigma_1^2}\right) \cdot \frac{\sigma_0^2}{\sigma_1^2}\exp\left(-\frac{x_2^2}{2\sigma_1^2}\right) \ldots \frac{\sigma_0^2}{\sigma_1^2}\exp\left(-\frac{x_n^2}{2\sigma_1^2}\right)}{\exp\left(-\frac{x_1^2}{2\sigma_0^2}\right) \exp\left(-\frac{x_2^2}{2\sigma_0^2}\right) \ldots \exp\left(-\frac{x_n^2}{2\sigma_0^2}\right)}$$

$$(7) \quad = \left(\frac{\sigma_0}{\sigma_1}\right)^{2n} \frac{\exp\left[-\frac{1}{2\sigma_1^2}(x_1^2 + x_2^2 + \ldots + x_n^2)\right]}{\exp\left[-\frac{1}{2\sigma_0^2}(x_1^2 + x_2^2 + \ldots + x_n^2)\right]}$$

$$(8) \quad = \left(\frac{\sigma_0}{\sigma_1}\right)^{2n} \exp\left[\left(\frac{1}{2\sigma_0^2} - \frac{1}{2\sigma_1^2}\right)(x_1^2 + x_2^2 + \ldots + x_n^2)\right]$$

or $$(9) \quad \frac{P_{in}}{P_{on}} = \left(\frac{\sigma_0}{\sigma_1}\right)^{2n} \exp\left[\left(\frac{1}{2\sigma_0^2} - \frac{1}{2\sigma_1^2}\right)\sum_{i=1}^{n} x_i^2\right]$$

The inequality of the Wald test $$(10) \quad B < \frac{P_{in}}{P_{on}} < A$$

through substitution for $$\frac{P_{in}}{P_{on}}$$

in the Rayleigh case becomes $$(11) \quad B < \left(\frac{\sigma_0}{\sigma_1}\right)^{2n} \exp\left[\left(\frac{1}{2\sigma_0^2} - \frac{1}{2\sigma_1^2}\right)\sum_{i=1}^{n} x_i^2\right] < A$$

Taking the logarithm of each term, which preserves the inequalities yields $$(12) \quad \ln B < \ln\left\{\left(\frac{\sigma_0}{\sigma_1}\right)^{2n} \exp\left[\left(\frac{1}{2\sigma_0^2} - \frac{1}{2\sigma_1^2}\right)\sum_{i=1}^{n} x_i^2\right]\right\} < \ln A$$

$$(13) \quad \ln B < 2n \ln\frac{\sigma_0}{\sigma_1} + \left(\frac{1}{2\sigma_0^2} - \frac{1}{2\sigma_1^2}\right)\sum_{i=1}^{n} x_i^2 < \ln A$$

If we let $\theta_0 = 2\sigma_0^2$ and $\theta_1 = 2\sigma_1^2$ then $$(14) \quad \ln B < \left(\frac{1}{\theta_0} - \frac{1}{\theta_1}\right)\sum_{i=1}^{n}\left(x_i^2 + \ln\frac{\theta_0}{\theta_1}\right) < \ln A$$

which defines mathematically the operations of the instant invention.

The limiter was inserted for laboratory use primarily and in most situations would not be used at all. A limiter would be used whenever detector characteristics adherence to precise theoretical performance is required, such as for special laboratory work or the detection of very small signals deeply embedded in noise.

The reason for the limiter 14 is that every electronic circuit has limiting characteristics such as those imposed by vacuum tubes, transistors or other active elements. This would also include insulation breakdown, however, this is not usually encountered in computational circuitry.

Without the limiter, at some input voltage to the sequential detector, limiting will occur at some point in the circuit; exactly where it is unimportant. Thus, very large inputs to the sequential detector would be treated as if their values were lower than actual as dictated by the limiting operation of the circuitry. Good design practice would result in a high limiting value; limiting would be infrequent and of little consequence in virtually all cases and the limiter, in practice, would be omitted.

The above uncontrolled limiting can cause some difficulty in critical applications, however. Suppose the limiting is, as stated above, quite infrequent. This means that occasionally an input will be treated as smaller than it actually is. The average of the inputs to the detector will be effectively reduced a small amount and the effect will be that of a very small reduction in the statistical parameter $\lambda$. Let $\delta$ be a small but appropriate positive number, then the detector will act as though the prime value was $\lambda_0 - \delta$ in a noise case and $\lambda_1 - \delta$ in a signal case. This results in the following shift: (1) the decision time without signal is slightly reduced, (2) the false alarm probability is slightly reduced, (3) the decision time with signal is slightly increased and (4) the miss-probability is slightly increased.

These shifts are inconsequential for all but laboratory and other critical applications. In these special cases either the shift effect caused by truncation can be compensated for by laboratory calibration of the sequential detector or by theoretical analysis. In special applications this difficulty can be avoided by use of the limiter stage. The concept is briefly this, if limiting at large values has the effect of reducing the average of the detector input, a corresponding limiting at the low level tends to increase the average input. These effects cancel if upper and lower limiting levels are properly chosen, either experimentally or theoretically. The limiting stage 14 provides both upper and lower limiting which can be adjusted.

The theory of adjusting the upper and lower levels of the limiter stage 14 consists of a mathematical analysis for two criteria. These are not given in that the theory is not important to the operation of the system due to the fact that the system is not degraded appreciably even if the limiter is not used.

The limiter stage 14 derives its input from the output of the square law circuit 13 of the figure. The output of the square law circuit 13 is indicated as $x_1^2$. This corresponds to the term in Formula 14. The output of the amplifier is indicated in the figure and is also derived from Formula 14 mentioned in connection with the square law circuit wherein the amplifier 16 has a gain $$\frac{1}{\theta_0} - \frac{1}{\theta_1}$$

The output of the adjustable attenuator 19 is a constant and is indicated as $$\ln \frac{\theta_0}{\theta_1}$$

and also is set forth in the same aforementioned Formula 14.

The summing network 17 does the summing set forth in Formula 14.

With respect to the formulas set forth for the Rayleigh distributions, Formula 1 is the general term for the Rayleigh distribution. Formula 2 corresponds to the Rayleigh distribution in the case of noise only while Formula 3 is the Rayleigh distribution in the signal case only.

Throughout the specification wherever the letters "exp" are used it denotes an abbreviation for exponential.

The levels set at terminals 27 and 28 refer to the upper and lower bounds respectively. The upper bound $$A \simeq \frac{1-\beta}{\alpha}$$

while the lower bound $$B \simeq \frac{\beta}{1-\alpha}$$

where $\beta$ is the desired probability of a miss and $\alpha$ is the desired probability of a false alarm, i.e., $\alpha$ equals the probability of accepting $H_1$ when $H_0$ is true, and $\theta$ equals the probability of accepting $H_0$ when $H_1$ is true: where $H_0$ is the hypothesis that noise alone is present and; $H_1$ is the hypothesis that signal is present in noise.

Obviously many modifications and variations of the present invention are possible in the light of the above teachings. It is therefore to be understood that within the scope of the appended claims the invention may be practiced otherwise than as specifically described.

What is claimed is:

1. A sequential signal detector comprising a signal input terminal adapted to be connected to the output of a radar system receiver, gating means connected to said signal input terminal, said gating means operable to gate any signal applied to said signal input terminal, a square law responsive means connected to the output of said gating means, limiting means connected to the output of said square law responsive means, a summing network connected to the output of said limiting means for summing a predetermined signal with the output of said limiting means, integrating means connected to the output of said summing means, target presence determining means connected to the output of said integrating means, said target presence determining means operable to generate a first pulse if the output of said integrating means reaches a first predetermined level and a second pulse if the output of said integrating means reaches a second predetermined level, and recycling means having an input connected to said target presence determining means and an output connected to said integrating means, said recycling means operable upon receiving either pulse from said target presence determining means to recycle said integrating means to a start condition.

2. The sequential signal detector of claim 1 wherein said predetermined signal is derived from any gating signal input applied to said gating means.

3. The sequential signal detector of claim 1 wherein said target presence determining means comprises first and second comparing means, said first and second comparing means each having a different reference input level for comparing the output of said integrating means thereto, each of said first and second comparing means operable to produce a pulse any time said integrator output equals its respective reference input level.

4. A sequential signal detector for determining the presence or lack of presence of a sequential signal in a noise background comprising a signal input terminal adapted to be connected to the sequential signal of interest, a gating pulse input terminal adapted for connection to a gating pulse in coincidence with said sequential signal, a gating means having a signal input connected to said signal input terminal and a gating pulse input connected to said gating pulse input terminal, a signal squaring means having an input connected to the output of said gating means, a limiting means connected to the output of said squaring means for limiting said signal to predetermined limits, attenuating means connected to said gating pulse input terminal, summation means connected to the outputs of said limiting means and said attenuating means for summing said gating pulse and said signal, integrating means connected to the output of said summing means, said integrating means having an output connected to the inputs of first and second comparing means, said first and second comparing means each having a different reference input level for comparing the output of said integrating means thereto, each of said first and second comparing means operable to produce a pulse any time said integrator output equals its respective reference input level, recycling means having inputs connected to the outputs of said comparing means and an output connected to said integrating means, said recycling means operable to re-set said integrating means upon receiving a pulse from said comparing means, and readout means having inputs connected to the outputs of said comparing means.

No references cited.